(12) United States Patent
Kitagawa et al.

(10) Patent No.: US 6,414,403 B2
(45) Date of Patent: *Jul. 2, 2002

(54) POWER UNIT

(75) Inventors: Seiya Kitagawa, Kawasaki; Mitsuo Saeki, Tokyo; Hidekiyo Ozawa, Kawasaki, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,879

(22) Filed: Sep. 23, 1998

(30) Foreign Application Priority Data

Dec. 26, 1997 (JP) ............................. 9-359689

(51) Int. Cl.⁷ ............................................. H02M 7/00
(52) U.S. Cl. ......................... 307/66; 323/224; 320/127
(58) Field of Search ........................ 307/66, 130, 140, 307/100, 64, 115; 323/224; 320/123, 166, 124, 132, 139, 127, 137

(56) References Cited

U.S. PATENT DOCUMENTS

| | | | | |
|---|---|---|---|---|
| 3,816,804 A | * | 6/1974 | Cardwell, Jr. ................ 307/66 |
| 5,161,097 A | * | 11/1992 | Ikeda ......................... 323/222 |
| 5,272,382 A | * | 12/1993 | Heald et al. .................. 307/66 |
| RE35,043 E | * | 9/1995 | Takeda .......................... 320/2 |
| 5,506,493 A | * | 4/1996 | Stengel ....................... 323/223 |
| 5,528,087 A | * | 6/1996 | Sibata et al. .................. 307/66 |
| 5,565,820 A | * | 10/1996 | Peyrotte et al. ............. 332/110 |
| 5,570,004 A | * | 10/1996 | Shibata ....................... 323/274 |
| 5,602,462 A | * | 2/1997 | Stich et al. .................... 307/66 |
| 5,610,450 A | * | 3/1997 | Saeki et al. ................... 307/46 |
| 5,616,968 A | * | 4/1997 | Fujii ........................... 307/66 |
| 5,710,507 A | * | 1/1998 | Rosenbluth et al. .......... 320/35 |
| 5,717,256 A | * | 2/1998 | Okumura et al. ............. 307/66 |
| 5,734,237 A | * | 3/1998 | Engel ......................... 318/139 |
| 5,739,667 A | * | 4/1998 | Matsuda et al. ............... 320/5 |
| 5,814,898 A | * | 9/1998 | Chen et al. .................... 307/66 |
| 5,814,972 A | * | 9/1998 | Shimada et al. ............. 320/132 |
| 5,835,366 A | * | 11/1998 | Pleso et al. .................... 307/66 |
| 5,945,806 A | * | 8/1999 | Faulk .......................... 320/127 |
| 5,990,664 A | * | 11/1999 | Rahman ...................... 320/135 |
| 6,074,775 A | * | 6/2000 | Gartstein et al. ............. 320/30 |
| 6,100,665 A | * | 8/2000 | Alderman .................... 320/127 |
| 6,188,199 B1 | * | 1/2001 | Beutler et al. ............... 320/125 |
| 6,184,649 B1 | * | 2/2001 | Phlipot ....................... 320/100 |
| 6,262,560 B1 | * | 7/2001 | Lionberg et al. .............. 307/48 |

* cited by examiner

*Primary Examiner*—Ronald W. Leja
*Assistant Examiner*—Roberto Rios
(74) *Attorney, Agent, or Firm*—Staas & Halsey LLP

(57) ABSTRACT

A power unit having a built-in battery to supply voltage from the battery over a long period of time by utilizing fully the capabilities of the built-in battery. The power unit supplies electric power to a load even when a battery with a higher battery voltage than the external power source voltage is used by charging the battery from an external power source even when the external power source voltage is lower than the battery voltage. By charging the battery when electric power is supplied to a load from an external power source, the power unit supplies electric power to the load from the battery when the supply of electricity from an external power source is cut off. The power unit includes a having converter to boost output voltage from the battery and to supply the voltage to the load when the battery is discharged and the external power source voltage is higher than the battery voltage. Alternatively, the power unit includes a converter to boost the external power source voltage and to charge the battery when using the battery with a voltage lower than the external power source voltage.

20 Claims, 9 Drawing Sheets

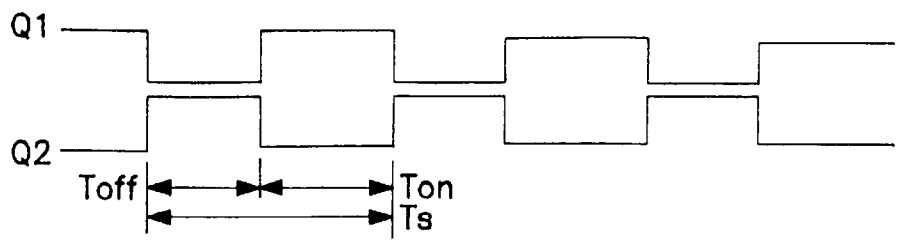

SWITCHING OF Q1 AND Q2 AT SYNCHRONOUS RECTIFICATION

FIG. 4A

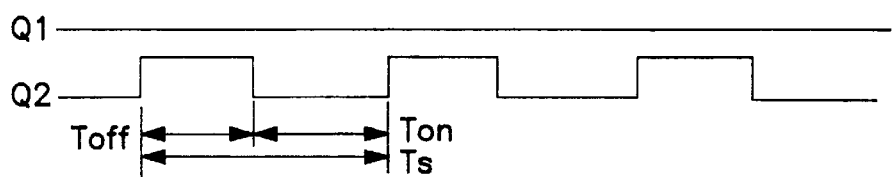

Q1 AND Q2 SWITCHING WHEN BOOSTING VOLTAGE WITHOUT SYNCHRONOUS RECTIFICATION

FIG. 4B

|  | Q1 | Q2 | OPERATION MODE | RELATION BETWEEN Vin AND Vbat |
|---|---|---|---|---|
| CHARGE | ON/OFF | OFF | REDUCTION | Vin > Vbat |
|  | ON/OFF | OFF/ON | REDUCTION PLUS SYNCHRONOUS RECTIFICATION | Vin > Vbat |
| DISCHARGE | ON | OFF | DIRECT | Vin < Vbat |
|  | OFF | ON/OFF | BOOSTING | Vin < Vbat |
|  | OFF/ON | ON/OFF | BOOSTING PLUS SYNCHRONOUS RECTIFICATION | Vin < Vbat |

RELATION BETWEEN OPERATION MODE AND Q1/Q2 SWITCHING

FIG. 4C

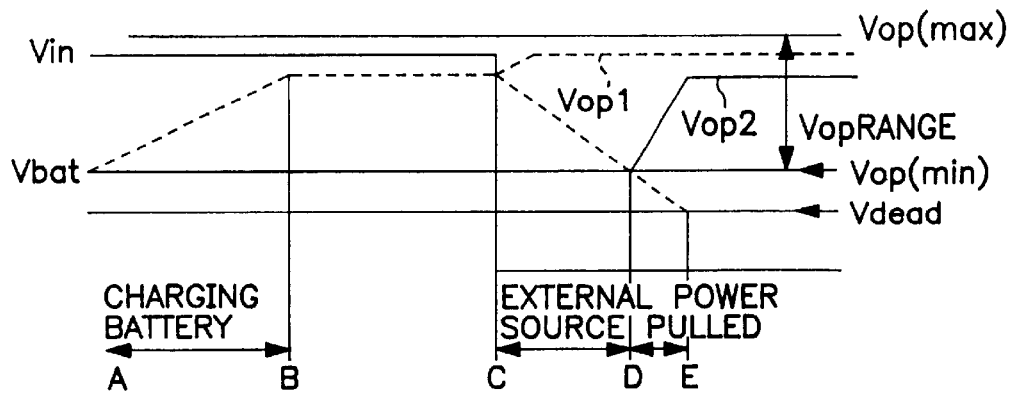

FIG. 4D

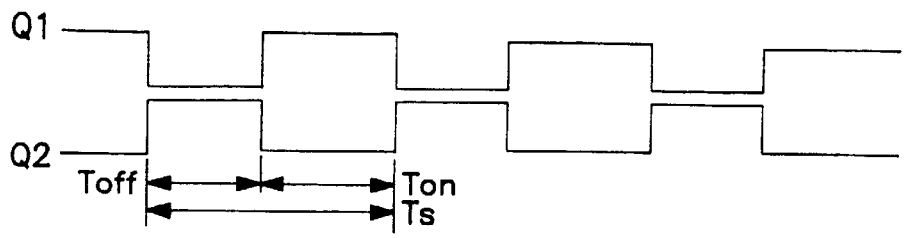
SWITCHING AT Q1 AND Q2 AT SYNCHRONOUS RECTIFICATION
FIG. 7A
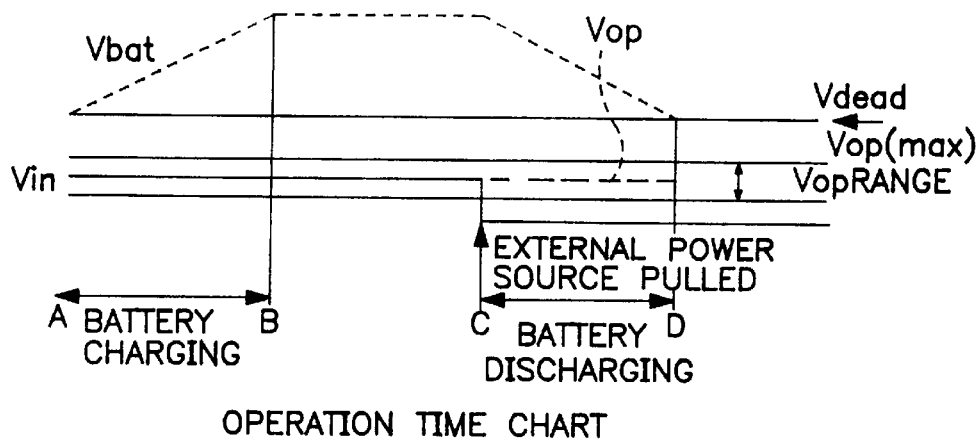
OPERATION TIME CHART
FIG. 7B
| | Q1 | Q2 | OPERATION MODE |
|---|---|---|---|
| CHARGE | OFF | ON/OFF | BOOSTING |
| | OFF/ON | ON/OFF | BOOSTING AND SYNCHRONOUS RECTIFICATION |
| DISCHARGE | ON | OFF | DIRECT |
| | ON/OFF | OFF | REDUCTION |
| | ON/OFF | OFF/ON | REDUCTION AND SYNCHRONOUS RECTIFICATION |
OPERATION MODE AND Q1/Q2 SWITCHING
FIG. 7C

OPERATION TIME CHART

POWER UNIT

BACKGROUND OF THE INVENTION

1. Field of the Invention

The present invention relates to a power unit having a built-in battery and which is suitable for use with small electronic instruments. More particularly, the present invention relates to a power unit to supply electric power to a load and having a built-in battery, wherein the power unit charges the battery even when electric power is being supplied to the load from an external power source at an external power source voltage lower than the battery voltage.

2. Description of the Related Art

Conventional power units used in personal computers and other small electronic instruments have built-in batteries and supply electric power to a load by connecting an AC adapter that converts commercial alternating current power into a specified direct current voltage. When the power unit is not connected to the AC adapter, the power unit supplies electric power to the load from the built-in battery. The conventional power units include a battery charger that uses external electric power to charge the built-in battery when connected to an external power source.

FIGS. 9A–9C illustrate a conventional type of power unit and its operation. More specifically, FIG. 9A illustrates a conventional power circuit; FIG. 9B is a timing diagram illustrating the switching action of a transistor Q1 of the power circuit shown in FIG. 9A; and FIG. 9C is a diagram illustrating the operation of the circuit shown in FIG. 9A.

As shown in FIG. 9A, an AC adapter connecting member 110 is connected to an AC adapter and receives a supply of electric power. A load 111 is supplied electric power from a battery 112 when electric power is not being supplied to the AC adapter connecting member 110 from an external power source. A charge/discharge control circuit 113 controls the charging of the battery 112 by switching the transistor Q1. A charge/discharge monitor circuit 114 monitors whether the battery 112 is charging or discharging, and, if the battery 112 is charging, the charge/discharge monitor circuit 114 monitors the state of the charge and controls switching of the transistor Q1. A battery protection switch 115 connected to the battery 112 shuts off when the battery 112 reaches a discharge final voltage (Vdead) so that the battery 112 does not discharge.

The power circuit includes capacitors C1, C2, an inductor L1, and a diode D1. During the time that the transistor Q1 is off, the diode D1 sends a flywheel electric current to the circuit L1-C1-D1. A diode D2 prevents electric current from flowing from the battery 112 to the AC adapter connecting member 110. A diode D3 is connected across the switching transistor Q1, and is a parasitic diode for the switching transistor Q1.

The switching action of the transistor Q1 controls the voltage applied to the battery 112. FIG. 9B illustrates the switching cycle of the transistor Q1. As shown in FIG. 9B, the switching period of the transistor Q1 is Ts; the on period of the transistor Q1 is Ton; and the off period of the transistor Q1 is Toff. FIG. 9C illustrates a relation between an external power source voltage Vin, a battery voltage Vbat, a discharge final voltage Vdead, a range of voltage Vop that operates the load 111, and a minimum voltage which operates the load Vop (min) (i.e., the minimum operating voltage) for the operation of the circuit shown in FIG. 9A.

The circuit shown in FIG. 9A operates as described below. The battery protection switch 115 remains on while the battery 112 has not yet reached the discharge final voltage Vdead. When the power unit is connected to the AC adapter, the external power source voltage Vin is greater than the battery voltage Vbat, and the power unit reduces the external power source voltage Vin and charges the battery 112. When the AC adapter connecting member 110 is connected to the AC adapter, the electric power input to the AC adapter connecting member 110 is supplied to the load 111 via the diode D2. The charge/discharge monitor circuit 114 monitors the condition of the AC adapter connecting member 110 connection and the status of the charge on the battery 112. The charge/discharge monitor circuit 114 relays the status of the charge on the battery 112 to the charge/discharge control circuit 113. If the battery 112 is fully charged, the charge/discharge control circuit 113 turns off the transistor Q1 and, in general, adjusts the period of time the transistor Q1 is switched on depending on the status of the charge on the battery 112. At this time, the relation between the voltage Vbat of the battery 112, the externally input voltage Vin, the switching time Ts of the transistor Q1, and the on time Ton of transistor Q1 is given by the following equation:

$$Vbat = Ton \times Vin / Ts.$$

Therefore, by adjusting the length of time Ton depending on the status of the charge on the battery 112, the reduction of the external power source voltage Vin is adjusted and the charging of the battery 112 can be controlled.

The charge/discharge monitor circuit 114 detects when no electric power is being supplied from an external source because of various causes, such as the AC adapter connecting member 110 not being connected to the AC adapter, and relays the detected information to the charge/discharge control circuit 113. The charge/discharge control circuit 113 turns transistor Q1 on and supplies electric power from the battery 112 to the load 111. At this time, electric current is prevented from flowing from the battery 112 to the AC adapter connecting member 110 by the diode D2, thus preventing unnecessary consumption of the battery 112.

FIG. 9C illustrates a relation between the charge/discharge of the battery 112 and the load voltage both when electric power is being supplied from an external power source and when electric power is not being supplied from an external power source. More particularly, FIG. 9C illustrates a relationship between the externally supplied voltage Vin; the terminal voltage Vbat of the battery 112; the operating voltage of the load Vop, which is the voltage range that operates the load 111; the minimum operating voltage Vop (min) of the load 111; and the discharge final voltage Vdead, which is the minimum battery voltage permitted by the battery 112.

As shown in FIG. 9C, the period AB is the length of time spent charging the battery 112 (Tchg). The period BC is the length of time the battery 112 is fully charged. The time at which the external power source (AC adapter) is disconnected is represented by C. The period AC is the length of time the battery 112 is connected to an external power source. The time at which the battery voltage Vbat reaches the minimum load operating voltage Vop is represented by D. The period CD is the length of battery 112 discharge time (Tdis). The time at which the battery voltage Vbat reaches the discharge final voltage (Vdead) is represented by E.

During the time period AB, the transistor switch Q1 is adjusted and the battery 112 is charged. During the time period BC, the battery 112 is fully charged and transistor Q1 is switched off. At time C, the external power source (AC adapter) is disconnected and transistor switch Q1 is switched on to supply electric power from the battery 112 to the load 111. During the time period CD, the battery 112 discharges. The battery protection switch 115 is turned off and voltage supply to the load 111 is halted when the battery voltage Vbat reaches the minimum operating voltage of the load Vop (min) at time D. At this time however, even when the supply of electric power to the load 111 from the battery 112 is halted at the point in time D, there still remains some power left in the battery 112 before it reaches the discharge final voltage Vdead. Therefore, use of the battery 112 is halted before the battery 112 is completely drained.

In the above-described manner, the conventional power unit with a built-in battery halts discharge from the battery 112 to the load 111 even though some power remains in the battery. For this reason, the battery's potential has not been fully utilized.

Furthermore, conventional power units always require the external power voltage Vin to be higher than the battery voltage Vbat. Moreover, because the battery voltage Vbat is an unstabilized power source, it can not directly supply loads which require that voltage be supplied at a specified voltage, such as logic circuits. Therefore, in accordance with the conventional power units, a specified-voltage power source, such as a DC/DC converter, has to be connected, adding more parts and leading to increased costs. Also, the conventional power units require a battery protection switch to prevent overdischarge of the battery.

SUMMARY OF THE INVENTION

It is an object of the present invention to provide a power unit having a built-in battery that can provide voltage from the battery for a longer period of time by fully utilizing the potential of the battery built into the power unit.

It is another object of the present invention to provide a power unit that can charge a battery even when electric power is being supplied to a load from an external power source at an external power source voltage that is lower than the battery voltage by fully increasing the battery voltage and supplying electric power from the battery to the load at a sufficiently high voltage.

Object and advantages of the present invention are achieved with a power unit that charges a battery power source when supplying electric power to a load from an external power source and supplies electric power to the load from the battery power source when the supply of electric power from the external power source is cut off, wherein the power unit includes a converter to boost the output voltage from the battery power source and to supply the output voltage to the load when the battery power source discharges.

Objects and advantages of the present invention are achieved with a power unit that charges a battery power source when supplying electric power to a load from an external power source and supplies electric power to the load from the battery power source when the supply of electric power from the external power source is cut off, wherein the power unit includes a converter to boost the input voltage from the battery power source and to charge the battery power source when the battery power source is charged.

BRIEF DESCRIPTION OF THE DRAWINGS

Objects and advantages of the invention will become apparent and more readily appreciated from the following description of the preferred embodiments, taken in conjunction with the accompanying drawings of which:

FIGS. 4A–4D are diagrams explaining the operation of the third embodiment of the present invention.

FIGS. 7A–7C are diagrams explaining the operation of the fifth embodiment of the present invention.

DESCRIPTION OF THE PREFERRED EMBODIMENTS

Figure 1:
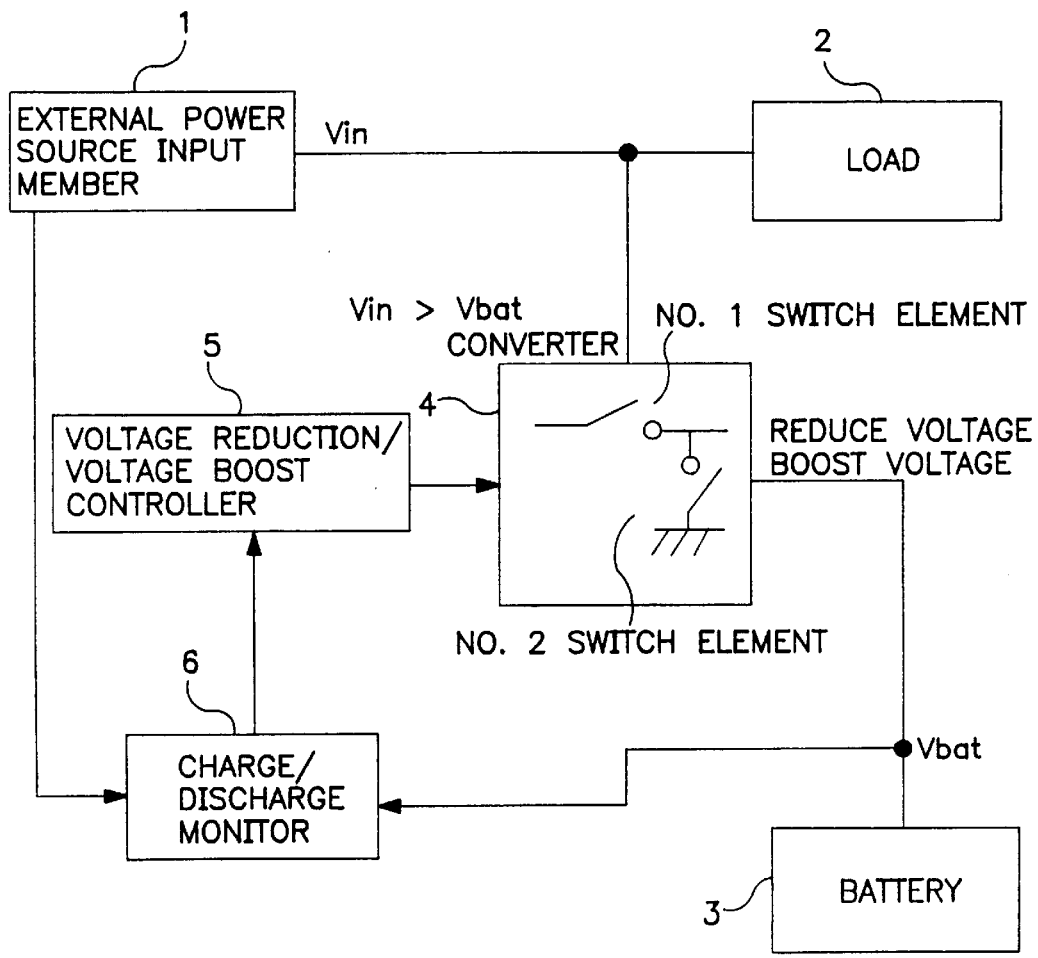
FIG. 1 illustrates a power unit in accordance with a first embodiment of the present invention.

Reference will now be made in detail to the preferred embodiments of the present invention, examples of which are illustrated in the accompanying drawings, wherein like reference numerals refer to the same or similar elements throughout.

FIG. 1 illustrates a power unit in accordance with a first preferred embodiment of the present invention. In accordance with the first embodiment the present invention shown in FIG. 1, the power unit enables a battery to be used for a long period of time by utilizing the battery's potential to the fullest in the event that an external power source voltage is higher than the battery voltage.

As shown in FIG. 1, an external power source input member 1 inputs external DC voltage at input voltage Vin. A load 2 is connected to the external power source input member 1. A battery 3 supplies a battery voltage Vbat, where Vin>Vbat. A converter 4 reduces the voltage when the battery 3 is charged from the external power source input member 1 and boosts the battery voltage when electric power is supplied from the battery 3 to the load 2. The converter 4 includes a first switch (No. 1 switch element) and a second switch (No. 2 switch element). The switching action of the respective first and second switches is controlled to reduce or boost the battery voltage. More specifically, the first switching element is between the external power source and the battery 3 and the second switching element is between the battery 3 and ground. By controlling the first and second switching elements, the converter 4 boosts the output voltage from the battery 3 to supply the output voltage to the load 2 when the battery 3 discharges and reduces the output voltage of the external power source when the battery 3 is charged. A voltage reduction/boost controller 5 controls the converter 4. A charge/discharge monitor 6 is connected to the voltage reduction/voltage boost controller 5.

The operation of the power unit in accordance with the first embodiment of the present invention shown in FIG. 1 will now be described below.

When supplying electric power to the load 2 from the external power source input member 1, the charge/discharge monitor 6 detects the charging of the battery 3 and relays that information to the voltage reduction/boost controller 5. The voltage reduction/boost controller 5 operates the converter 4 to reduce the voltage of the external power source input member 1. The converter 4 reduces the voltage of the external power source input member 1 and charges the battery 3.

When electric power is supplied from the battery 3 to the load 2, the charge/discharge monitor 6 detects the need to supply electric power from the battery 3 to the load 2 and relays that information to the voltage reduction/boost controller 5. The voltage reduction/boost controller 5 operates the converter 4 to boost the voltage of the battery 3. The converter 4 boosts the voltage of the battery 3 and supplies the voltage to the load 2. At this point, the power unit monitors the battery voltage and supplies the battery voltage to the load 2 without boosting the battery voltage or reducing the battery voltage if the battery voltage is above the minimum load operating voltage Vop (min). The power unit can be configured to boost the battery voltage when the battery voltage reaches the discharge final voltage (Vdead).

In accordance with the first embodiment of the present invention shown in FIG. 1, the power unit can be operated because the battery voltage is boosted to above the operating voltage of the load Vop, even when the battery voltage drops below the minimum load operating voltage Vop (min). Thus, the power unit can be operated until the battery 3 reaches the discharge final voltage Vdead and the length of time the power unit can be operated by battery power can be increased.

Figure 2:
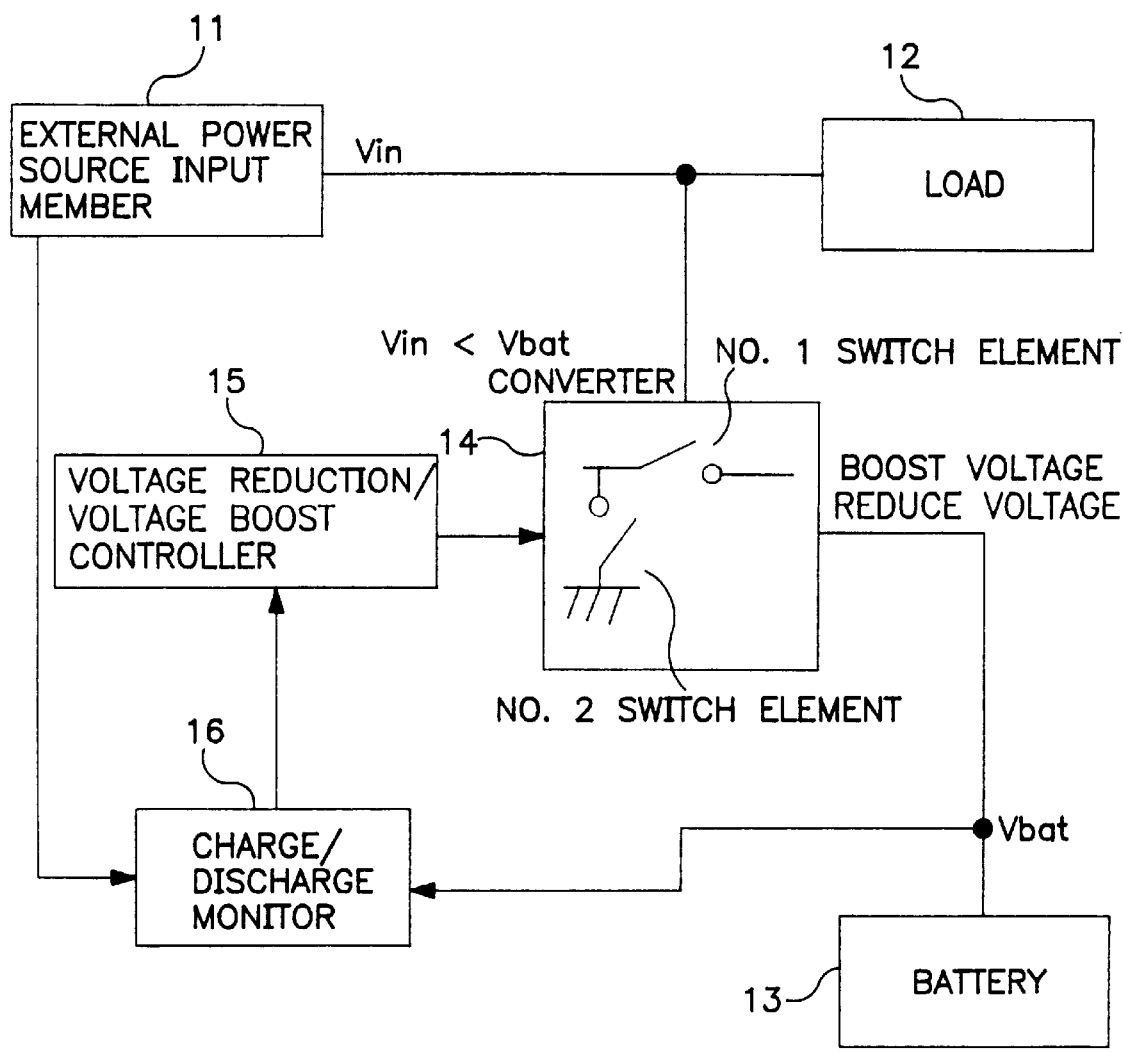
FIG. 2 illustrates a power unit in accordance with a second embodiment of the present invention.

FIG. 2 illustrates a power unit in accordance with a second preferred embodiment of the present invention. In accordance with the second embodiment of the present invention shown in FIG. 2, the supply of electric power to a load 12 from a battery 13 over long periods of time is performed by raising the battery voltage to a sufficiently high level. Further, in accordance with the second embodiment of the present invention, the charging of the battery 13 is performed while supplying electric power to the load 12 from an external power source, even when the external power source voltage is lower than the battery 13 power source.

As shown in FIG. 2, an external power source input member 11 having input voltage Vin is connected to the load 12. A battery 13 supplies a battery voltage Vbat, where Vin<Vbat. A converter 14 boosts the voltage when charging the battery 13 from the external power source input member 11 and reduces the voltage when supplying electric power from the battery 13 to the load 12. The converter 14 includes a first switching element between the external power source input member 11 and the battery 13 and a second switching element between the external power source input member 11 and ground. The converter 14 boosts the output voltage from the battery 13 and supplies the output voltage to the load 12 when the battery 13 is charged, and the converter 14 reduces the output voltage of the battery 13 when the battery 13 discharges. A voltage reduction/boost controller 15 controls the converter 14. A charge/discharge monitor 16 monitors the battery 13.

The operation of the power unit in accordance with the second embodiment of the present invention shown in FIG. 2 will now be described below.

When electric power is supplied to the load 12 from the external power source input member 11, the charge/discharge monitor 16 detects the supply of electric power from the external power source input member 11 and relays that information to the voltage reduction/boost controller 15. The voltage reduction/boost controller 15 operates the converter 14 to boost the voltage. The converter 14 boosts the voltage of the external power source input member 11 and charges the battery 13.

When electric power is supplied to the load 12 from the battery 13, the charge/discharge monitor 16 detects whether there is no input from the external power source input member 11 or whether the voltage of the external power source input member 11 is abnormally low. The charge/discharge monitor 16 then detects the need to supply electric power from the battery 13 to the load 12 and relays that information to the voltage reduction/boost controller 15. The voltage reduction/boost controller 15 operates the converter 14 to reduce the voltage of the battery 13. The converter 14 reduces the voltage of the battery 13 and supplies the battery voltage to the load 12.

At this point, the power unit monitors the battery voltage and can either reduce the battery voltage if it is above the maximum voltage at which the load 12 can operate (the maximum load operating voltage Vop (max)) and supply the battery voltage to the load, or apply the battery voltage to the load 12 without reduction if the battery voltage is below the maximum load operating voltage Vop (max). Furthermore, if the discharge final voltage of the battery 13 is higher than the minimum load operating voltage Vop (min), then the power unit applies the battery voltage to the load 12 without reduction until discharge final voltage. However, if the discharge final voltage is lower than the minimum load operating voltage Vop (min), then the power unit halts discharge at the point at which the battery voltage reaches minimum load operating voltage Vop (min).

In accordance with the second embodiment of the present invention shown in FIG. 2, the battery voltage can be fully increased and electric power can be supplied to the load 12 at a high battery voltage. For this reason, voltage can be supplied from the battery 13 to the load 12 at a stable rate and the length of time during which the battery 13 is used can be greatly increased. Furthermore, the external power source voltage is boosted and supplied to the battery 13, so the battery 13 can be charged from the external power source even if the externally supplied voltage is lower than the battery voltage.

Figure 3:
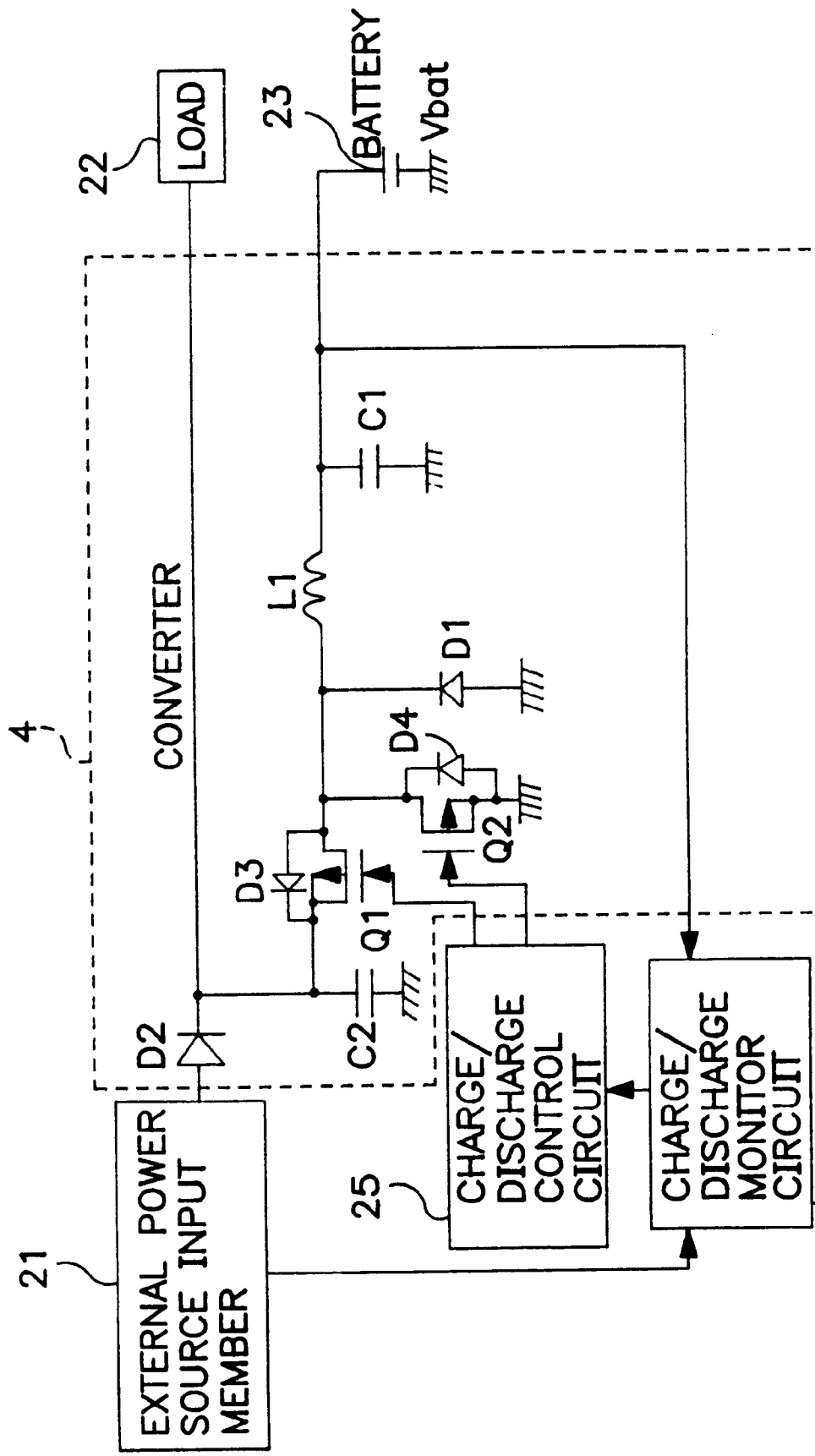
FIG. 3 illustrates a power unit in accordance with a third embodiment of the present invention.

FIG. 3 illustrates a power unit in accordance with a third embodiment of the present invention. As shown in FIG. 3, an external power source input member 21 provides an input voltage Vin, and a battery 23 supplies a battery voltage Vbat to a load 22. A charge/discharge monitor circuit 24 corresponds to the charge/discharge monitor circuit 6 shown in FIG. 1. A charge/discharge control circuit 25 corresponds to the voltage reduction/boost controller 5 shown in FIG. 1.

The converter 4 includes a transistor switch Q1 which reduces the voltage supplied from the battery 23 to the load 22 by its switching action, a transistor switch Q2 which boosts the external power source input member 21 voltage Vin by its switching action, capacitors C1 and C2, an inductor L1, a diode D1 which sends a flywheel current through the circuit L1-C1-D1 when the transistor Q1 and the transistor Q2 are both switched off (using a small reduced voltage from the parasitic diode of transistor Q1), a reverse-current preventer diode D2, a transistor Q1 parasitic diode D3, and a transistor Q2 parasitic diode D4.

The operation of the third embodiment of the present invention will now be described below with reference to FIGS. 4A–4D.

FIG. 4A illustrates the switching relation between the transistor Q1 and the transistor Q2 during a synchronous rectification mode. As shown in FIG. 4A, switching is accomplished during an inversion phase (i.e., when transistor Q1 is on transistor Q2 is turned off, and when transistor Q1 is off transistor Q2 is turned on). Toff is the period of time during which transistor Q2 is off, Ton is the period of time during which transistor Q2 is on, and Ts is the switching cycle, where Ts=Toff+Ton.

The synchronous rectification reduces the voltage when charging the battery 23 from the external power source input member 21 so that Vbat=Vin×Von/Ts, in a manner similar to switching transistor Q1 with transistor Q2 off. Furthermore, synchronous rectification boosts the voltage when supplying electric power from the battery 23 to the load 22, such that Vop=Vbat×Ts/Toff (where Vop is the load operating voltage).

FIG. 4B is a timing diagram illustrating a relation between transistors Q1 and Q2 when boosting the battery voltage without relying on synchronous rectification. The action of the transistors Q1 and Q2 occurs when discharging to supply electric power from the battery 23 to the load 22 and involves boosting the battery voltage Vbat and supplying the voltage to the load 22 without synchronous rectification. As shown in FIG. 4B, the transistor Q2 is switched while the transistor Q1 off. The period of time during which transistor Q2 is off is Toff, the period of time during which transistor Q2 is on is Ton, and the switching cycle Ts=Toff+Ton. When the battery voltage is boosted without relying on synchronous rectification, Vop=Vbat×Ts/Toff, in the same manner as with synchronous rectification (where Vop is the load operating voltage).

FIG. 4C is a table showing the relation between operation mode and switching of transistors Q1, Q2 in accordance with the third embodiment of the present invention. FIG. 4D is a diagram explaining operation of the third embodiment of the present invention wherein, as shown in FIG. 4D, Vin is the externally supplied voltage; Vbat is the battery voltage; Vop is the load operating voltage; Vop (max) is the maximum load operating voltage; Vop (min) is the discharge final voltage of the load; and Vdead is the discharge final voltage of the battery and is the minimum battery voltage permitted by the battery 23.

The operation of the third embodiment of the invention will now be described below with reference to FIGS. 3, 4C and 4D. As shown in FIG. 3, electric power is supplied from an external power source via the external power source input member 21 to the load 22. The external power source voltage is reduced by the switching of the transistor Q1 and the battery 23 is charged. Voltage is supplied to the load 22 from the battery 23 whenever the external power source input member 21 is not connected to an external power source. At such times, the battery voltage is boosted by the switching of the transistor Q2 and supplied to the load 22.

In accordance with the third embodiment of the invention, there are two modes for charging the battery 23.

1. In a first mode of charging the battery 23, the transistor Q2 is off and the transistor Q1 is switched.
2. In a second mode of charging the battery 23, transistors Q1 and Q2 are switched during the inversion phase (i.e., synchronous rectification). In either case, voltage is reduced and, as previously noted, Vbat=Vin×Von/Ts.

There are three modes for discharging the battery 23.

1. In a first mode of discharging the battery 23, the transistor Q1 is left on and the transistor Q2 is left off, applying the voltage of the battery 23 to the load 22.
2. In a second mode of discharging the battery 23, the transistor Q1 is left off and the transistor Q2 is switched boosting the battery voltage and applying it to the load 22. In accordance with the first and second modes, the voltage created by the energy stored in the inductor L1 due to the switching operation is applied to the battery voltage Vbat stored in capacitor C2, and the voltage is boosted so that it is higher than Vbat and supplied to the load 22. Further, the relation between the load operating voltage Vop and Vbat is Vop=Vbat×Ts/Toff.
3. In a third mode of discharging the battery 23, the transistors Q1 and Q2 are switched during the inversion phase (synchronous rectification). The third mode of discharging the battery 23 is similar to the second mode of discharging the battery 23, and the voltage created by the energy built up in the inductor L1 by the switching of the transistor Q2 is applied to the battery voltage Vbat stored in capacitor C2, boosted and supplied to the load 22. At this time, the relation between load operating voltage Vop and Vbat is Vop=Vbat×Ts/Toff.

The overall operation of the third embodiment of the invention shown in FIG. 3 will now be described below with reference to FIG. 4D. Synchronous rectification begins when the power unit initially detects the voltage of the external power source input member 21 and determines that if the voltage of the external power source input member 21 is at a specified voltage as an external power source, then transistor Q1 is turned on. If the external power source is not at the specified voltage, and electric power is supplied from the battery 23 to the load 22 right from the start, then this sort of necessity does not exist.

When external power is supplied to the external power source input member 21, as during the time period AC in FIG. 4D, the power unit detects the input of external power source voltage and relays that information to the charge/discharge control circuit 25. The charge/discharge control circuit 25 then switches transistors Q1 and Q2 during the inversion phase and executes synchronous rectification. The charge/discharge control circuit 25 then reduces the external power source voltage and supplies the voltage to the battery 23. Alternatively, the charge/discharge control circuit 25 turns transistor Q2 off, and by switching Q1 alone reduces the voltage and charges the battery 23. At this time, the charge/discharge monitor circuit 24 monitors the status of the charge on the battery 23 and relays that information to the charge/discharge control circuit 25. The charge/discharge control circuit 25 controls the charging of the battery 23 by adjusting the length of time switching is on depending on the status of the charge on the battery 23. When the battery 23 is fully charged, as at the point in time B in FIG. 4D, the charging of the battery 23 is halted.

When the charge/discharge monitor circuit 24 detects either that no external power is being supplied to the external power source input member 21 or that it is necessary to supply power to the load 22 from the battery 23 because the external power that is being supplied is not at a specified voltage, etc., as at point in time C in FIG. 4D, the charge/discharge monitor circuit 24 then relays that information to the charge/discharge control circuit 25. The charge/discharge monitor circuit 24 then determines whether the battery voltage Vbat is higher than or lower than the minimum load operating voltage Vop (min) and relays that information to the charge/discharge control circuit 25. The charge/discharge control circuit 25 leaves the transistor Q1 on and the transistor Q2 off when the battery voltage Vbat is higher than the minimum load operating voltage Vop (min), as during the time period CD in FIG. 4, and supplies the battery voltage Vbat to the load 22. In this case, Vop=Vbat. Alternatively, provided the voltage boost does not exceed the maximum operating voltage of the load Vop (max), the power unit can boost the battery voltage either by leaving transistor Q1 off and switching transistor Q2 or by synchronous rectification, and then supply the battery voltage to the load 22. In this case, Vop is shown as Vop1 in FIG. 4D.

In the event that the battery voltage Vbat is lower than the minimum operating voltage of the load Vop (min), as during the time period DE in FIG. 4D, the charge/discharge control circuit 25 leaves transistor Q1 off and switches transistor Q2 to boost the battery voltage Vbat and supply the battery voltage to the load 22. Alternatively, the charge/discharge control circuit 25 switches transistors Q1 and Q2 in the inversion phase and executes synchronous rectification to boost the battery voltage and supply the battery voltage to the load 22. In this case, Vop is shown as Vop2 in FIG. 4D.

Figure 5:
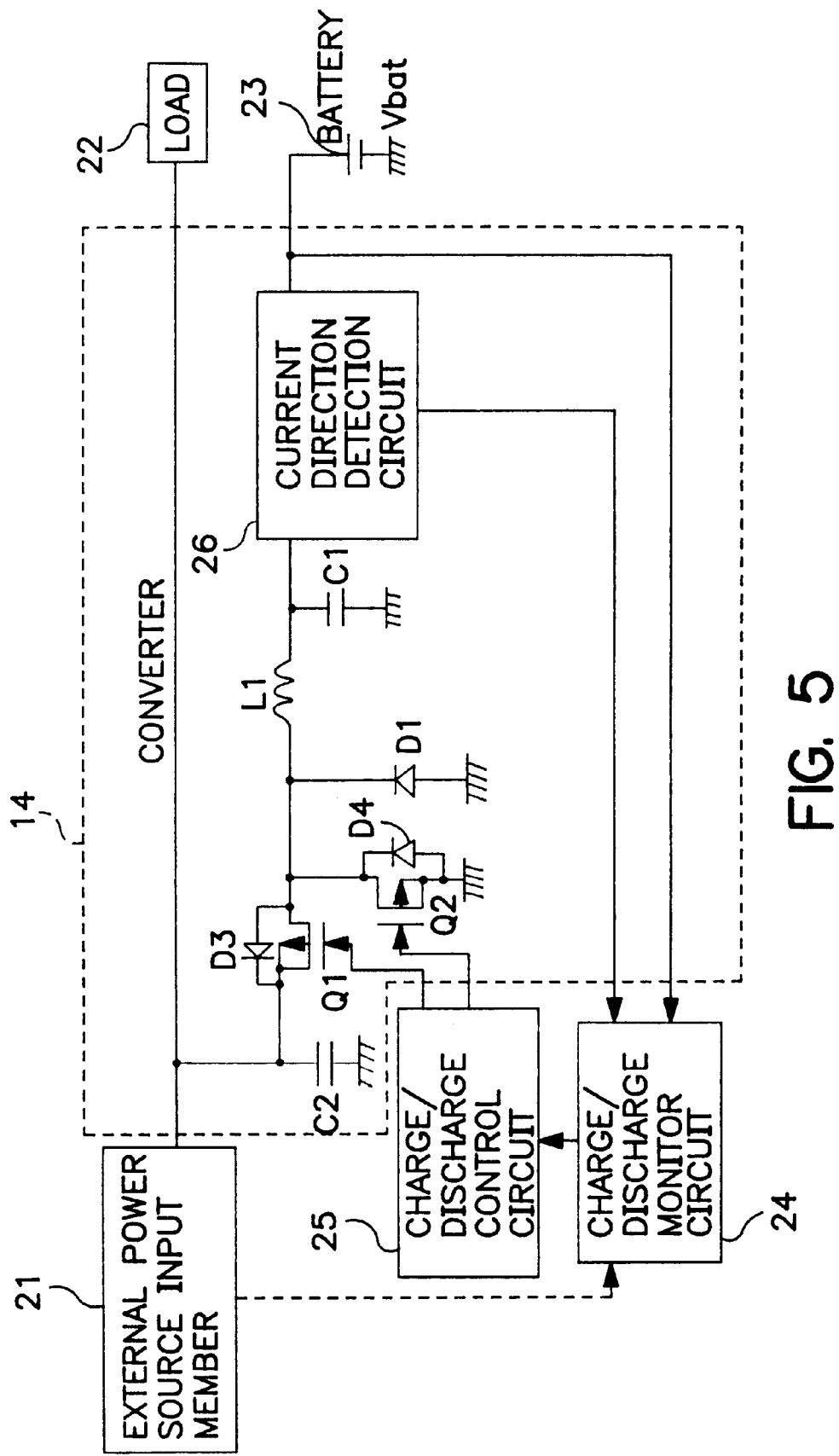
FIG. 5 illustrates a power unit in accordance with a fourth embodiment of the present invention.

FIG. 5 illustrates a power unit in accordance with a fourth embodiment of the present invention. Like elements in the third and fourth embodiments are referred to by like reference numerals, and a detailed description of the like elements will not be repeated here. The fourth embodiment of the present invention shown in FIG. 5 differs from the third embodiment of the present invention shown in FIG. 3 in that the determination of whether to charge or discharge the battery is made based upon by the flow of the current through a current direction detection circuit 26 inserted in series between the battery 23 and the external power source input member 21.

In operation of the fourth embodiment of the present invention shown in FIG. 5, the charge/discharge monitor circuit 24 initially determines whether the external power source input member 21 is at a specified voltage. If the external power source input member 21 is at the specified voltage, then the power unit begins operation by turning transistor Q1 on.

Initially, if the external power source voltage Vin is at or above the specified voltage, then transistors Q1 and Q2 are set to charge mode, either by commencing synchronous rectification with transistor Q1 on, or by switching transistor Q1 with transistor Q2 off. Thereafter, when the supply of external power from the external power source input member 21 ceases, or when the voltage drops due to some malfunction or other reason, current flows from the battery 23 in the direction of the load 22. This changes the direction of the current flowing through the current direction detection circuit 26, and the current direction detection circuit 26 sends a signal to the charge/discharge monitor circuit 24 indicating that current is flowing from the battery 23 toward the load 22. The charge/discharge monitor circuit 24 sets the operation mode at time of discharge at Q1 and Q2 according to the battery voltage at that time.

If the voltage at the external power source input member 21 is below a specified voltage when starting up the power unit, current flows from the battery 23 toward the load 22. At that point, the charge/discharge monitor circuit 24 monitors the battery voltage, and leaves transistor Q1 on and transistor Q2 off if the battery voltage is higher than Vdead and applies the battery voltage to the load 22. The battery voltage can also be boosted as long as boosting the battery voltage does not exceed the maximum load operating voltage. The charge/discharge monitor circuit 24 boosts the battery voltage and supplies the battery voltage to the load 22 if the battery voltage is lower than Vdead. This can be done either by synchronous rectification or by turning transistor Q1 off and switching transistor Q2. Thereafter, as the external power source input member 21 is connected to an external power source and electric power is supplied from the external power source, the direction of the current flowing through the current direction detection circuit 26 changes. The current direction detection circuit 26, having detected the change in direction of current, sends a signal to the charge/discharge monitor circuit 24 indicating that current is flowing from an external power source toward the battery 23. The charge/discharge monitor circuit 24 determines the status of the charge on the battery 23 and relays that information to the charge/discharge control circuit 25. The charge/discharge control circuit 25 then sets the charge mode at transistors Q1 and Q2 according to the state of the charge on the battery 23.

The respective operation modes of the fourth embodiment of the invention shown in FIG. 5 are the same as those described for the third embodiment of the invention shown in FIG. 3.

Figure 6:
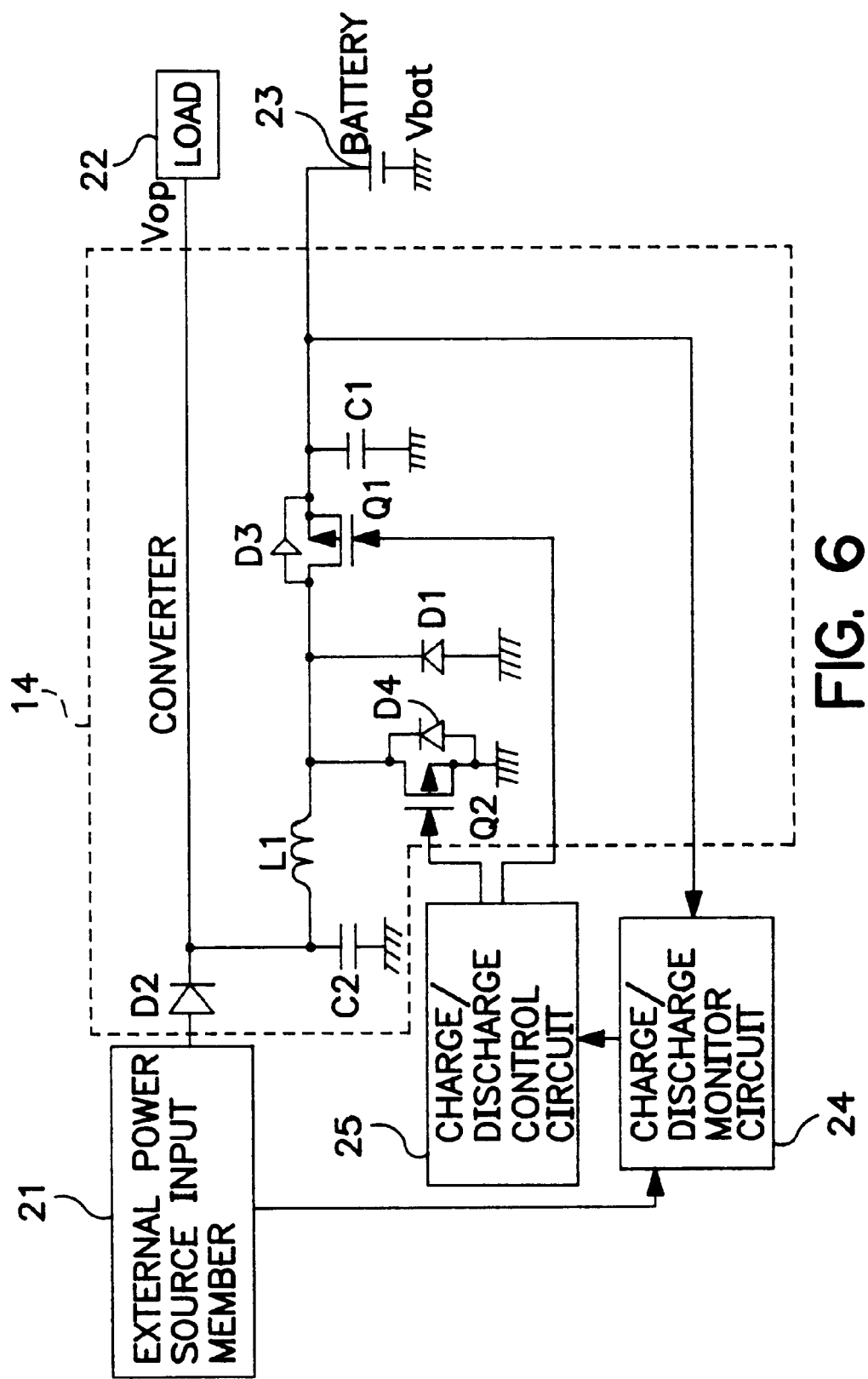
FIG. 6 illustrates a power unit in accordance with a fifth embodiment of the present invention.

FIG. 6 illustrates a power unit in accordance with a fifth embodiment of the present invention. The embodiment shown in FIG. 6 is similar to the embodiment shown in FIG. 2.

The power unit in accordance with the fifth embodiment of the present invention shown in FIG. 6 is applicable to small electronic devices with a built-in battery power source, which typically use an AC adapter as their external power source and a built-in battery with a voltage lower than that of the external power source. However, a built-in battery with a high voltage can extend the length of time the device can be used on battery power. Moreover, at times, the electronic device is used with an external power source having a voltage that is lower than that obtained via an AC adapter. For example, if the load voltage is 3V and the external power is 3V or 5V at the time, the built-in battery power unit of the present invention would be 7V. In accordance with the present invention, the voltage of 3V or 5V supplied from an external power source is boosted to 7V when connected to the external power source and charges the battery. Then, when electric power is supplied to the load from the power unit of the present invention, the voltage of the built-in battery is reduced from 7V to 3V or 5V and supplied to the load 22.

As shown in FIG. 6, a converter 14 is connected between the external power source input member 21 having an input voltage Vin and the load 22. A battery 23 provides a battery voltage Vbat. A charge/discharge monitor circuit 24 corresponds to the charge/discharge monitor circuit 16 shown in FIG. 2. A charge/discharge control circuit 25 corresponds to the charge/discharge control circuit shown in FIG. 2.

The converter 14 includes a transistor switch Q1 which reduces the voltage supplied to the load 22 from the battery 23 by its switching action, a transistor switch Q2 which boosts the voltage Vin at the external power source input member 21 by its switching action, capacitors C1 and C2, an inductor L1, a diode D1 which sends a flywheel current through the circuit L1-C1-D1 when both transistors Q1 and Q2 are off, a reverse-current preventer diode D2, a transistor Q1 parasitic diode D3 and a transistor Q2 parasitic diode D4.

The operation of the power unit in accordance with the fifth embodiment of the present invention shown in FIG. 6 will now be described below with reference to FIGS. 7A–7C. FIG. 7A illustrates a relationship between the switching of the transistor Q1 and the transistor Q2 during synchronous rectification. Switching is preformed during the inversion phase, with the transistor Q2 off when the transistor Q1 is on and with the transistor Q2 on when the transistor Q1 is off. As shown in FIG. 7A, Toff is the period of time during which transistor Q2 is off, Ton is the period of time during which transistor Q2 is on, and Ts is the switching cycle, where Ts=Toff+Ton.

By performing synchronous rectification, when charging the battery 23 from the external power source input member 21, the power unit boosts the voltage so that Vbat=Vin×Ts/Toff (in the same manner as when turning transistor Q1 off and switching transistor Q2). Similarly, when supplying electric power from the battery 23 to the load 22, the power unit reduces the voltage so that Vop=Vbat×Ton/Ts (Vop is the load operating voltage).

FIG. 7B is a diagram illustrating operation of the power unit in accordance with the fifth embodiment of the present invention. More particularly, FIG. 7B illustrates the operation of the power unit when the battery discharge final voltage (Vdead) is higher than the minimum load operating voltage (Vop (min)). As shown in FIG. 7B, Vin is an externally supplied voltage;

Vbat is a battery voltage; Vop is a load operating voltage which is the voltage range within which the load operates; Vop (min) is a minimum load operating voltage; Vdead is the discharge final voltage of the battery and is the minimum battery voltage permitted by the battery 23.

As shown in FIG. 7B, period of time during which the power unit is connected to an external power source is represented by the time period AC. The period of time during which the battery 23 is being charged (Tchg) is represented by the time period AB. The period of time during which the battery 23 is fully charged is represented by the time period BC. The point in time C is a point at which the external power source is disconnected. The period of time during which the battery 23 discharges (Tdis) is represented by the time period CD.

The operation of the power unit in accordance with the fifth embodiment of the invention shown in FIG. 6 will now be described below with reference to FIG. 7C. In accordance with the embodiment shown in FIG. 6, electric power from an external power source is supplied to the load 22 from the external power source input member 21. The external power source voltage is boosted by the switching action of the transistor Q1 and charges the battery 23. When the external power source input member 21 is not connected to an external power source, power is supplied to the load 22 from the battery 23. At this time, the transistor Q2 is switched, and the battery voltage is reduced and supplied to the load 22. Initially, the power unit starts by determining the voltage on the external power source input member 21 and, if the voltage is a voltage specified for when connected to an external power source, the transistor Q2 is turned off and the transistor Q1 is turned on to boost the voltage. The power unit starts with the transistor Q1 on if there is no specified external power source voltage because the power unit is not connected to an external power source, or for some other reason.

In accordance with the fifth embodiment of the present invention, there are two modes for charging the battery. In accordance with a first mode, the transistor Q1 is off and the transistor Q2 is switched (i.e., voltage boost mode). In accordance with a second mode, the transistors Q1 and Q2 are switched during the inversion phase (i.e., voltage boost mode via synchronous rectification). In either case, the voltage is boosted and as previously noted, Vbat=Vin×Vs/Toff.

In accordance with the fifth embodiment of the invention, there are three modes for discharging the battery. In accordance with a first mode, the transistor Q1 is on and the transistor Q2 is left off. At this time, the voltage of the battery 23 will be applied to the load 22. In accordance with a second mode, the transistor Q2 is off and the transistor Q1 is switched. At this time, the voltage that has been reduced to a voltage lower than the battery voltage Vbat by the switching action of the transistor Q1 is supplied to the load 22, and the relation between the load operating voltage Vop and Vbat is Vop=Vbat×Ton Ts. In accordance with a third mode, the transistors Q1 and Q2 are switched during the inversion phase (i.e., synchronous rectification). At this time, a voltage lower than the battery voltage Vbat is supplied to the load 22 by the action of switching transistors Q1 and Q2 during the inversion phase. The relation between the load operating voltage Vop and the battery voltage Vbat is Vop=Vbat×Ts/Toff.

The entire operation of the power unit in accordance with the fifth embodiment of the invention shown in FIG. 6 is described below. When external power is supplied to the external power source input member 21, the power unit detects an external power voltage input and relays that information to the charge/discharge control circuit 25. The charge/discharge control circuit 25 switches the transistors Q2 and Q1 during inversion phase and executes synchronous rectification. The external power is then boosted and supplied to the battery 23. Alternatively, the transistor Q1 is turned off and only the transistor Q2 is switched, thus boosting the voltage and charging the battery 23. At this time, the charge/discharge monitor circuit 24 monitors the status of the charge on the battery and relays that information to the charge/discharge control circuit 25. The charge/discharge control circuit 25 controls the charging of the battery 23 by adjusting the length of time the switching is on depending on the state of the charge on the battery 23.

When the charge/discharge monitor circuit 24 detects either that no external power is being supplied to the external power source input member 21 or that it is necessary to supply power to the load 22 from the battery 23 because the external power that is being supplied is not of the specified voltage, etc., it then relays that information to the charge/discharge control circuit 25. The charge/discharge control circuit 25 then leaves transistor Q2 off and switches transistor Q1 to reduce the battery voltage and supply the battery voltage to the load 22. Alternatively, the battery voltage Vbat is reduced and supplied to the load 22 by switching transistors Q1 and Q2 during the inversion phase to execute synchronous rectification.

If the battery power voltage is lower than the maximum operating voltage of the load Vop when the battery voltage is reduced and supplied to the load 22, then transistor Q1 can be turned on and transistor Q2 turned off and the battery voltage can be supplied to the load 23 without reduction. Furthermore, if the battery discharge final voltage (Vdead) is higher than the minimum load operating voltage Vop (min), then transistor switch Q1 is turned off when the battery voltage reaches the discharge final voltage (Vdead) and discharge from the battery is completed. Alternatively, if the minimum load operating voltage Vop (min) is higher than the discharge final voltage (Vdead), then transistor Q2 is turned off when the battery voltage reaches the minimum load operating voltage Vop (min), thus stopping battery discharge.

Moreover, in accordance with the fifth embodiment of the invention shown in FIG. 6, a voltage can be applied to the load 22 at a battery voltage higher than the operating voltage of the load 22, so that even at the battery discharge final voltage Vdead a battery voltage higher than the operating voltage of the load Vop can be used, thus lengthening the amount of time the power unit can be operated using the battery 22.

FIG. 7C is a table summarizing the relation between the operation of the power unit shown in FIG. 6 and the switching operations of the transistors Q1 and Q2.

Figure 8:
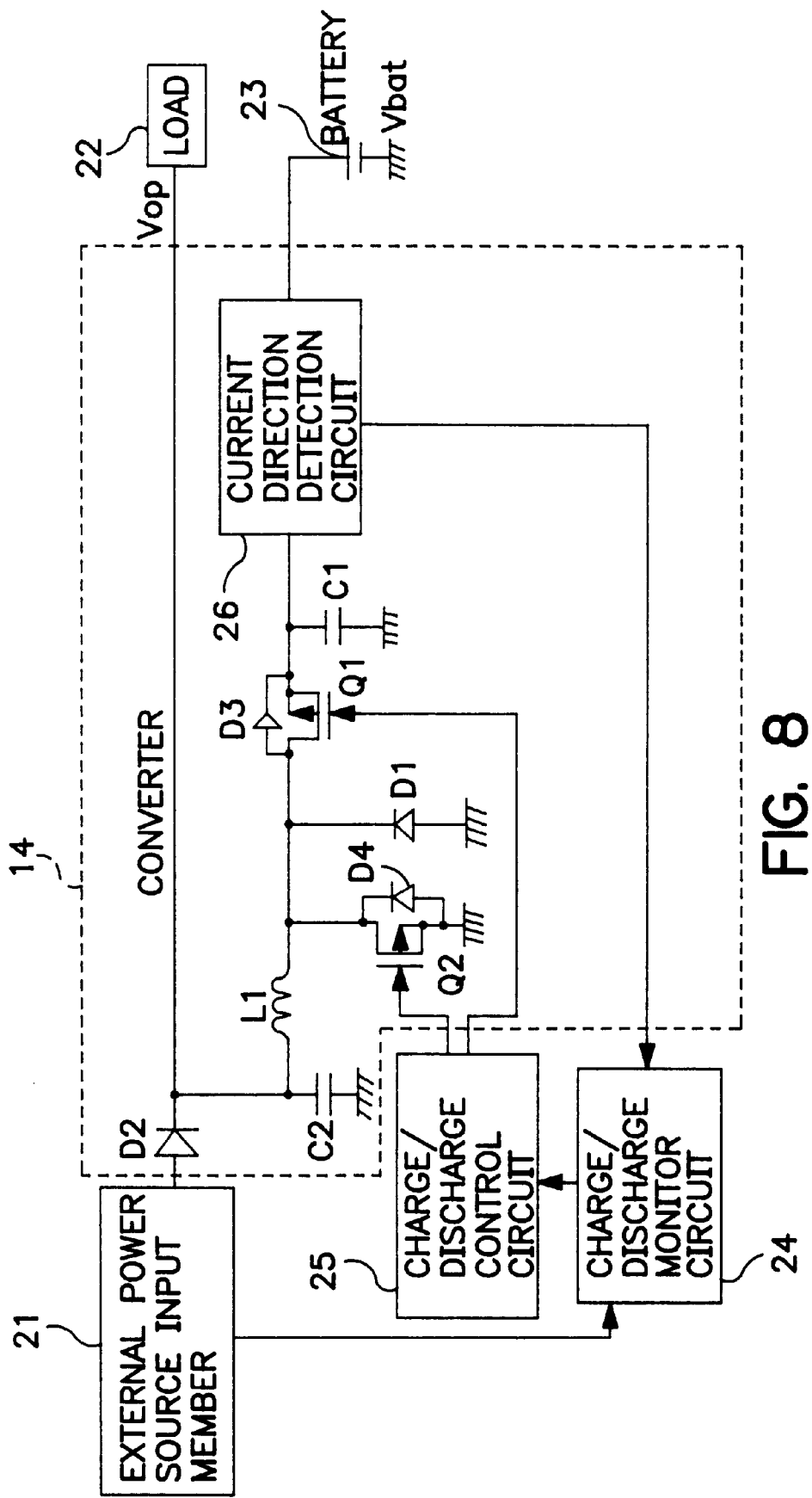
FIG. 8 illustrates a power unit in accordance with a sixth embodiment of the present invention.
Figure 9A:
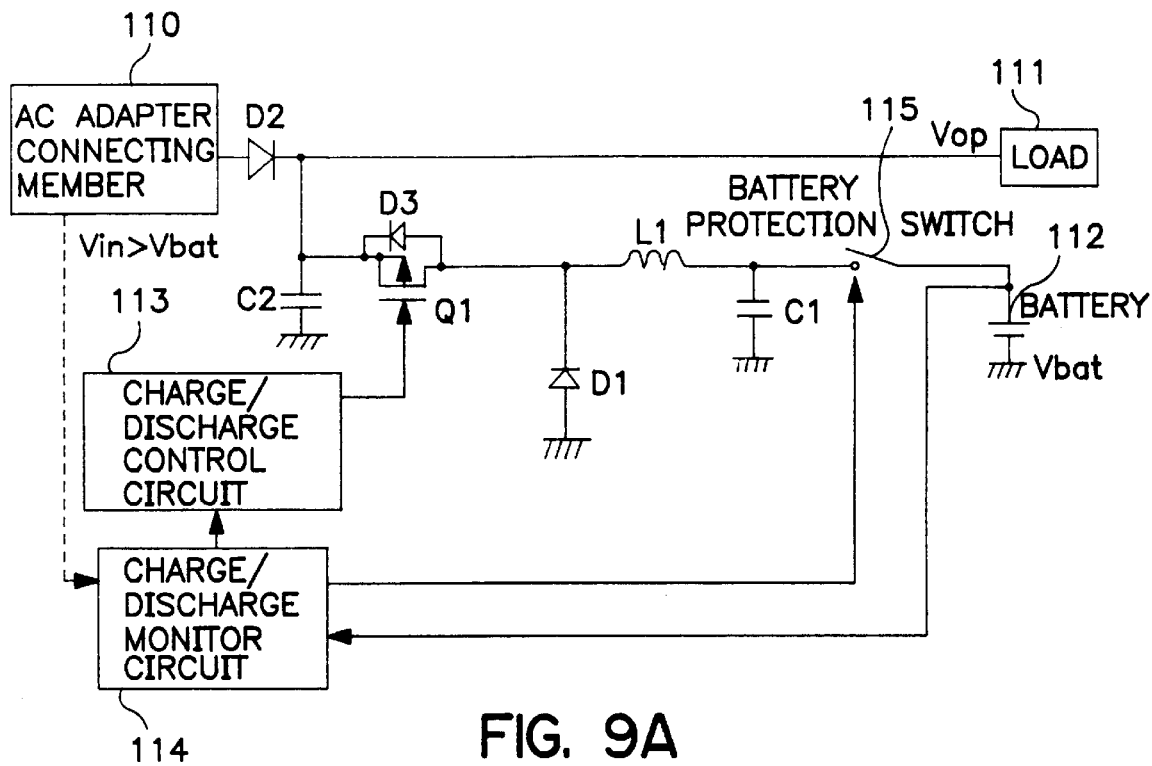
FIGS. 9A–9C are diagrams illustrating a conventional power unit.
Figure 9B:
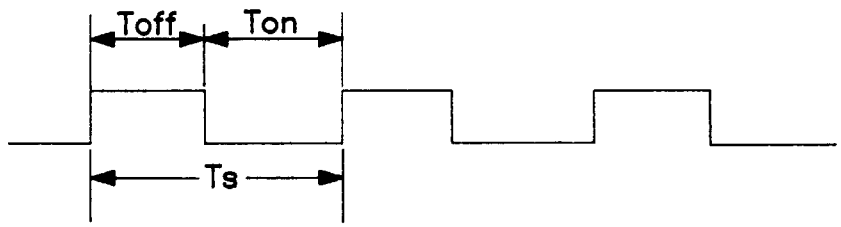
Figure 9C:
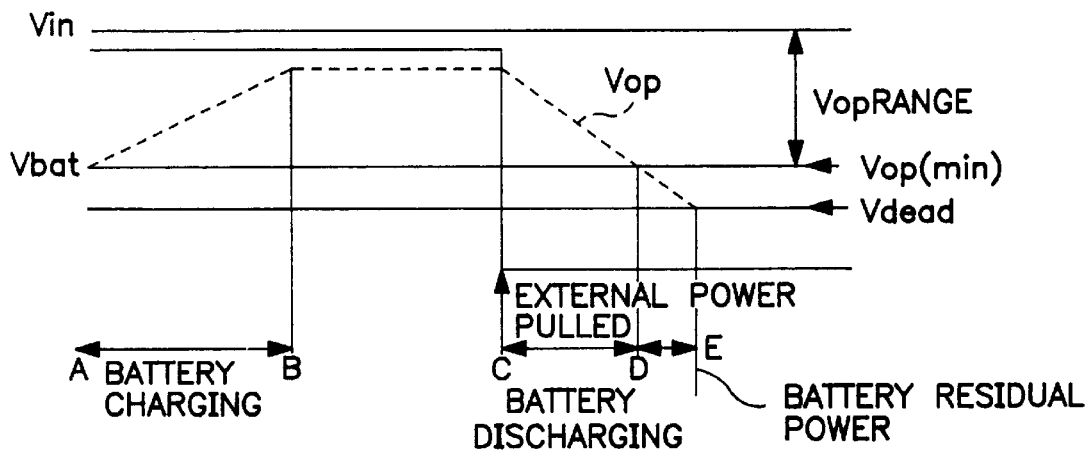

FIG. 8 illustrates a power unit in accordance with a sixth embodiment of the present invention. The embodiment shown in FIG. 8 is similar to the embodiment shown in FIG. 2. Furthermore, the embodiment of the invention shown in FIG. 8 differs from the embodiment of the present invention shown in FIG. 6 only in that the determination of whether to charge or discharge the battery is determined by the flow of the current through a current direction detection circuit 26 inserted in series between the battery 23 and the external power source input member 21. Elements shown in FIG. 8 which are the same as those shown in FIG. 6 are referred to by the same reference numerals and a detailed description of the like elements will not be repeated here.

As shown in FIG. 8, the current direction detection circuit 26 detects whether or not there is a current flowing from the external power source input member 21 toward the battery 23, or conversely, whether or not there is a current flowing from the battery 23 toward the load 22. The charge/discharge monitor circuit 24 initially determines whether the external power source input member 21 is connected to an external power source or, if the external power source input member 21 is connected to an external power source, whether voltage is being input properly.

Initially, the power unit determines the voltage on the external power source input member 21. If the voltage is of the specified external power voltage due to connection to an external power source, etc., then the power unit starts up by boosting the voltage by turning the transistor Q2 off and the transistor Q1 on. If there is no specified external power source voltage because the power unit is not connected to an external power source, etc., then the power unit begins by turning transistor Q1 on.

Initially, if power voltage Vin is at or above the specified value, then transistors Q1 and Q2 are set to a charge mode. Thereafter, when the supply of external power from the external power source input member 21 ceases, or when the voltage drops due to some malfunction, current flows from the battery 23 in the direction of the load 22. The direction of the current flowing through the current direction detection circuit 26 is thereby changed, and the current direction detection circuit 26 sends a signal to the charge/discharge monitor circuit 24 indicating that the current is flowing from the battery 23 toward the load 22. The charge/discharge monitor circuit 24 then sets the operation mode at time of discharge at Q1 and Q2 according to the battery voltage at the time.

If the voltage at the external power source input member 21 is below the specified voltage when starting up the power unit, the charge/discharge monitor circuit 24 relays that information to the charge/discharge control circuit 25 which then sets the disposition of transistors Q1 and Q2 for the battery 23 discharge mode. Thereafter the charge/discharge monitor circuit 24 detects the supply of external power from the external power source input member 21. Moreover, if the supply of electric power from an external power source to the external power source input member 21 stops, the direction of the flow of the current changes, and the current flows from the battery 23 to the load 22. The current direction detection circuit 26, having detected the change in the direction of current flow, sends a signal to the charge/discharge monitor circuit 24. The charge/discharge control circuit 25 then sets the transistors Q1 and Q2 to the discharge mode.

The operations of the respective charge and discharge modes of the embodiment of the invention shown in FIG. 8 are the same as for the embodiment of the invention shown in FIG. 6.

In accordance with embodiments of the present, the power unit can be operated because the battery voltage is boosted to above the voltage Vop, even when the battery voltage drops below the load minimum operating voltage Vop (min), so the power unit can be operated until the battery reaches a discharge final voltage Vdead and the length of time the power unit can be operated by battery power can be increased.

Furthermore, in accordance with embodiments of the present invention, the battery voltage can be fully increased and electric power can be supplied to the load at a high battery voltage. Accordingly, voltage can be supplied from the battery to the load at a stable rate and the length of time during which the battery is used can be greatly increased. Furthermore, the external power source voltage is boosted and supplied to the battery, and the battery can be charged from the external power source even if the externally supplied voltage is lower than the battery voltage.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A power unit to charge a battery when electric power is supplied to a load, which load is not part of the power unit, from an external power source and to supply electric power to the load from the battery when electric power from the external power source is cut off, comprising:

a converter to boost an output voltage from the battery and to supply the boosted output voltage directly to the load when the battery discharges to below a minimum load operating voltage, wherein the converter includes a first switching element between the external power source and the battery and a second switching element between the battery and ground.

2. The power unit as recited in claim 1, wherein the first switching element is turned off and the second switching element is turned on and off when the battery discharges.

3. The power unit as recited in claim 1, wherein the first and second switching elements are turned on and off alternately when the battery discharges.

4. The power unit as recited in claim 3, wherein the converter reduces the output voltage of the external power source when the battery is charged.

5. The power unit as recited in claim 4, wherein the first and second switching elements are turned on and off alternately when the battery is charged.

6. The power unit as recited in claim 4, wherein the first switching element is turned on and off and the second switching element is turned off when the battery is charged.

7. The power unit as recited in claim 1, wherein the first switching element and the second switching element are field effect transistors.

8. A power unit to charge a battery when electric power is supplied to a load from an external power source and to supply electric power to the load from the battery when electric power from the external power source is cut off, comprising:

a converter to boost a voltage input from an external power source and to supply the boosted input voltage to the battery when the battery is charged, said converter includes a first switching element between the external power source input member and the battery and a second switching element between the external power source input member and the ground, wherein the first switching element is turned on and the second switching element is turned on and off when the battery is charged, wherein the converter reduces the output voltage of the battery when the battery discharges, and wherein the first switching element is turned on and off and the second switching element is turned off.

9. A power unit to charge a battery when electric power is supplied to a load from an external power source and to supply electric power to the load from the battery when electric power from the external power source is cut off, comprising:

a converter to boost a voltage input from an external power source, and to supply the boosted input voltage to the battery when the battery is charged, said converter includes a first switching element between the external power source input member and the battery and a second switching element between the external power source input member and the ground, wherein the first switching element is turned on and the second switching element is turned on and off when the battery is charged, wherein the converter reduces the output voltage of the battery when the battery discharges, and wherein the first and second switching elements are turned on and off alternately when the battery discharges.

10. A power unit to charge a battery when electric power is supplied to a load from an external power source and to supply electric power to the load from the battery when electric power from the external power source is cut off, comprising:

a converter to boost an output voltage from the battery and to supply the output voltage to the load when the battery discharges to below a minimum load operating voltage, wherein the converter includes a first switching element between the external power source and the battery and a second switching element between the battery and ground.

11. The power unit as recited in claim 10, wherein the first switching element is turned off and the second switching element is turned on and off when the battery discharges.

12. The power unit as recited in claim 10, wherein the first and second switching elements are turned on and off alternately when the battery discharges.

13. The power unit as recited in claim 12, wherein the converter reduces the output voltage of the external power source when the battery is charged.

14. The power unit as recited in claim 13, wherein the first and second switching elements are turned on and off alternately when the battery is charged.

15. The power unit as recited in claim 13, wherein the first switching element is turned on and off and the second switching element is turned off when the battery is charged.

16. A power unit to charge a battery when electric power is supplied to a load from an external power source and to supply electric power to the load from the battery when electric power from the external power source is cut off, comprising:

a converter to boost a voltage input from an external power source and to supply the boosted input voltage to the battery when the battery is charged, wherein the converter includes a first switching element between the external power source input member and the battery and a second switching element between the external power source input member and the ground, and wherein the first and second switching elements are turned on and off alternately when the battery is charged.

17. A power unit to charge a battery when electric power is supplied to a load from an external power source and to supply electric power to the load from the battery when electric power from the external power source is cut off, comprising:

a converter to boost a voltage input from an external power source and to supply the boosted input voltage to the battery when the battery is charged, wherein the converter includes a first switching element between the external power source input member and the battery and a second switching element between the external power source input member and the ground, wherein the first switching element is turned on and the second switching element is turned on and off when the battery is charged, and wherein the converter reduces the output voltage of the battery when the battery discharges.

18. The power unit as recited in claim 17, wherein the first switching element is turned on and off and the second switching element is turned off.

19. The power unit as recited in claim 17, wherein the first and second switching elements are turned on and off alternately when the battery discharges.

20. A power unit to charge a battery when electric power is supplied to a load from an external power source and to supply electric power to the load from the battery when electric power from the external power source is cut off, comprising:

a converter to boost an output voltage from the battery and to supply the output voltage to the load when the battery discharges to below a minimum load operating voltage, wherein the converter includes a first switching element between the external power source and the battery and a second switching element between the battery and ground, and wherein the first switching element and the second switching element are field effect transistors.

* * * * *